United States Patent
Morris et al.

(10) Patent No.: US 8,228,532 B2
(45) Date of Patent: Jul. 24, 2012

(54) HARDWARE CONTROLLED ONE-TIME WRITE FOR FISCAL PRINTERS

(75) Inventors: Julie Anne Morris, Raleigh, NC (US); James Manson White, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 11/832,183

(22) Filed: Aug. 1, 2007

(65) Prior Publication Data

US 2009/0033980 A1    Feb. 5, 2009

(51) Int. Cl.
*G06F 3/12* (2006.01)
*G06K 15/00* (2006.01)

(52) U.S. Cl. .................... 358/1.15; 358/1.16
(58) Field of Classification Search .......... None
See application file for complete search history.

(56) References Cited

U.S. PATENT DOCUMENTS 4,312,037 A * 1/1982 Yamakita ............... 705/24
2004/0255141 A1 * 12/2004 Hodder et al. ........... 713/200

* cited by examiner

*Primary Examiner* — Thierry Pham
(74) *Attorney, Agent, or Firm* — Yee & Associates, P.C.; Tom Tyson

(57) ABSTRACT

A computer implemented method and data processing system for providing a hardware controlled one-time write for fiscal printers. A signal from a fiscal printer is received at a memory controller in an electronic journal or fiscal memory card. The signal comprises transaction data and an address in a memory space in the electronic journal or fiscal memory card. The memory controller checks a marker bit corresponding to the address to determine if the marker bit is in a written state. Responsive to a determination that the marker bit is not in a written state, the memory controller sets the marker bit to the written state. The memory controller then writes the transaction data to the address in the memory space.

18 Claims, 4 Drawing Sheets

HARDWARE CONTROLLED ONE-TIME WRITE FOR FISCAL PRINTERS

BACKGROUND OF THE INVENTION

1. Field of the Invention

The present invention relates generally to an improved data processing system, and in particular to a computer implemented method and data processing system for providing a hardware controlled one-time write for fiscal printers.

2. Description of the Related Art

Taxing authorities in some countries implement fiscal laws which provide auditing tools for securing public revenue and eliminating tax evasion on retail sales. These fiscal laws require retailers to keep special records of their retail sales transactions at the point of sale. Sales transactions are recorded at a point-of-sale device in the form of an electronic journal and a fiscal memory.

An electronic journal is a file which holds information for each individual transaction so that a receipt can be recreated. For instance, a journal may contain a line for each sale and its various subcomponents, such as the item and quantity purchased, method of payment used, the payment tendered, etc. The electronic journal is typically stored on a compact flash card connected to the point-of-sale printer. The compact flash card is mounted on a printed circuit board (PCB) and the PCB is connected to the microprocessor/interface card of the printer. The compact flash card is controlled by commands from the microprocessor in the printer. An appropriate command from the microprocessor in the compact flash card causes data to be written to the card. The compact flash card has its own file system, so the card controls the placement of the data. At the end of a day, the compact flash card reorganizes all of the transactions from the day and rewrites the transactions to itself in a more organized manner.

Fiscal memory is a non-volatile memory which holds specialized information from all of the transactions of the day, such as sales totals. Fiscal memory is written once at the end of a day. Fiscal memory comprises information which may be used, for example, by a taxing authority to determine if a retailer has submitted payment to the taxing authority of all taxes collected from customer sales. A one-time-programmable electronically programmable read only memory (EPROM) is typically used as the fiscal memory.

While existing fiscal systems allow transaction information to be recorded for auditing by a taxing authority, these systems are still susceptible to being tampered with in several ways. For instance, since the electronic journal is controlled by software and firmware, a change to the code can cause security issues for the journal. In addition, the compact flash card rewrites the data at the end of the day, so a corruption in the compact flash card could alter the stored data. The data on the compact flash card is also able to be moved and rewritten, so there is a chance that data could be overwritten and thus lost. Furthermore, since data can be rewritten to the compact flash card, then the erase function must still be enabled on the compact flash card, thus allowing a routine that hackers can use to remove transaction data. Moreover, written areas for the fiscal memory are recorded in a table that the microprocessor populates. If this table is erased, then it must be recreated. The table may or may not contain errors.

BRIEF SUMMARY OF THE INVENTION

The illustrative embodiments provide a computer implemented method and data processing system for providing a hardware controlled one-time write for fiscal printers. A signal from a fiscal printer is received at a memory controller in an electronic journal or fiscal memory card. The signal comprises transaction data and an address in a memory space in the electronic journal or fiscal memory card. The memory controller checks a marker bit corresponding to the address to determine if the marker bit is in a written state. Responsive to a determination that the marker bit is not in a written state, the memory controller sets the marker bit to the written state. The memory controller then writes the transaction data to the address in the memory space.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
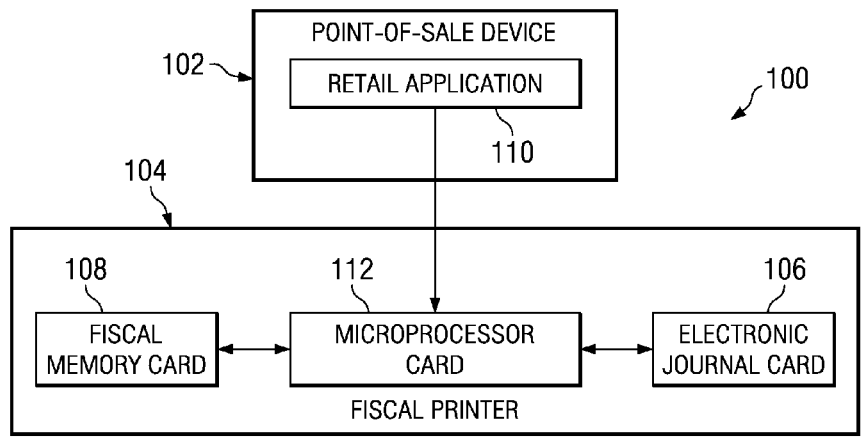
FIG. 1 depicts a pictorial representation of an exemplary fiscal system in which the illustrative embodiments may be implemented.

The illustrative embodiments improve upon existing fiscal systems by adding a function in hardware to current electronic journal and fiscal memory solutions. This function provides a one-time write feature controlled by hardware that enables a memory controller on a chip to monitor and check whether or not transaction data comprising electronic journal or fiscal memory data has already been written to a memory space. Consequently, when a microprocessor in a fiscal printer attempts to store transaction data at a particular memory location in the memory space, the memory controller allows the microprocessor to store the transaction data at a desired memory location only if the memory controller determines that transaction data has not already been written to that memory location.

The memory controller monitors and checks the memory locations using "marker bits". Each memory location in the memory space has a corresponding bit of information, or marker bit. These marker bits may contain a value which indicates a state of the memory location and whether the memory location has been written to or not. For example, if the marker bit for a particular memory location is in one state (i.e., the "written" state), the bit indicates to the memory controller that the particular memory location has already been written to. If a marker bit is in the other state (i.e., the "unwritten" state), the bit indicates to the memory controller that the particular memory location has not been written to. For example, a '1' bit for the memory location may indicate a "not written" state and a '0' bit may indicate a "written" state, and vice versa.

Prior to writing transaction data to a particular address in the memory space, the memory controller performs a check of the marker bit. If the check of the marker bit results in a determination that the memory location has already been written to, then the microprocessor can choose another memory location in which to write the transaction data. If the check results in a determination that the memory location has not been written to, the marker bit for the desired memory location is set to the "written" state, and the transaction data may then be written to that memory location.

The marker bits for the memory locations may be stored in the same chip in which the transaction data is stored, or they may be stored on an external memory chip. To further ensure that transaction data or marker bit data may not be overwritten, the erase functionality is removed for both the memory space that holds the transaction data, as well as the external memory that holds marker bit information.

Adding a hardware-controlled one-time write feature as described in the illustrative embodiments provides several advantages over existing electronic journal and fiscal memory solutions. The illustrative embodiments improve data security by removing the ability to overwrite good transaction data, as well as by removing the possibility of internal chip file system corruptions causing data corruption. The illustrative embodiments also remove the possibility of code changes to tamper with write cycles.

With reference now to the figures, FIG. 1 depicts a pictorial representation of an exemplary fiscal system in which the illustrative embodiments may be implemented. The transactions described in the illustrative embodiments may include any economic activity in which tax liability is imposed. In one embodiment, the transaction is a retail transaction. As used herein, a retail transaction may include a sale or exchange of items, such as groceries, clothing, jewelry, sporting goods, pets, equipment, appliances, tools, books, music, movies, gift cards, beverages, drugs/prescription medications, or any other type of merchandise, goods, products, or items bought, sold, or offered for sale. A retail transaction may also include the sale or exchange of services, such as a car wash, carpet cleaning, delivery and installation of appliances, or any other services bought, sold, or offered for sale.

With a retail transaction, the point of transaction is the point-of-sale where the transaction is initiated, conducted, and/or terminated. The point-of-sale may be a checkout counter in a store or any other location where a transaction occurs, such as a register located at a movable kiosk display in a mall. The point-of-sale may also include online retail store websites accessed by customers through an Internet connection.

Fiscal system 100 is shown to comprise point-of-sale terminal 102, fiscal printer 104, electronic journal card 106, and fiscal memory card 108. Point-of-sale terminal 102 comprises hardware and software. Point-of-sale hardware may include, for example, a cash register or computer performing similar tasks, a touch screen monitor, a pin pad, a magnetic card reader, a receipt printer, and a barcode scanner. Point-of-sale software may include software or firmware, such as retail application 110, for processing the sales transactions.

Point-of-sale terminal 102 may have stored therein product information, such as universal product code (UPC) information or stock keeping unit (SKU) information for the items. The item information may include item description, price, and the like. Alternatively, point-of-sale terminal 102 may communicate with a store computer through a local area network (LAN) to obtain the product information.

A shopper may collect items for purchase and present these items to point-of-sale terminal 102 for purchase. When a customer presents the items at point-of-sale terminal 102, identification information for the items is entered into the point-of-sale terminal. The identification information may include a SKU, UPC, or other product identifier, and may be scanned using a bar code reader or the like. Point-of-sale terminal 102 may comprise a scanner for entering the identification information by reading coded product information or a terminal for manually entering such product information.

Fiscal printer 104 is connected to point-of-sale terminal 102 by a communications link, such as a serial communications link. Fiscal printer 104 generates customer receipts and electronic journal and fiscal memory records for transactions occurring at point-of-sale terminal 102. Fiscal printer 104 is controlled by microprocessor card 112, which receives transaction information from point-of-sale terminal 102. Microprocessor card 112 issues the command to write an electronic journal record to electronic journal card 106 or a fiscal memory record to fiscal memory card 108. A write command is issued to electronic journal card 106 to store intermediate/individual sales transactions. A write command is issued to fiscal memory card 108 to store sales and tax totals covering a particular time period.

Electronic journal card 106 and fiscal memory card 108 are connected to and controlled by microprocessor card 112. Each of electronic journal card 106 and fiscal memory card 108 comprises a complex programmable logic device (CPLD) or a field-programmable gate array (FPGA), and memory. The memory in electronic journal card 106 and fiscal memory card 108 may comprise non-volatile flash memory (specifically, NAND) or a one-time-programmable electronically programmable read only memory (EPROM) for storing the electronic journal and fiscal memory records. Each of electronic journal card 106 and fiscal memory card 108 may optionally comprise a static random access memory (SRAM) "buffer" used to temporarily store transaction data received from the fiscal printer for more efficient operation. However, all transaction data is persisted in the non-volatile flash memory or EPROM.

Fiscal system 100 may include servers, clients, and other devices not shown. For example, a server may provide data, such as product information, to a client device. The server may be a web server and a user may communicate with the web server using a browser application in a client device, as is known in the art. The customer may use the client device to purchase items from an online retailer at the server containing or connected to a point-of-sale terminal. The browser application of the client device may communicate with the server via the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, fiscal system 100 also may be implemented as a number of different types of networks, such as, for example, an intranet, a local area network (LAN), or a wide area network (WAN). FIG. 1 is intended as an example, and not as an architectural limitation for the illustrative embodiments.

Figure 2:
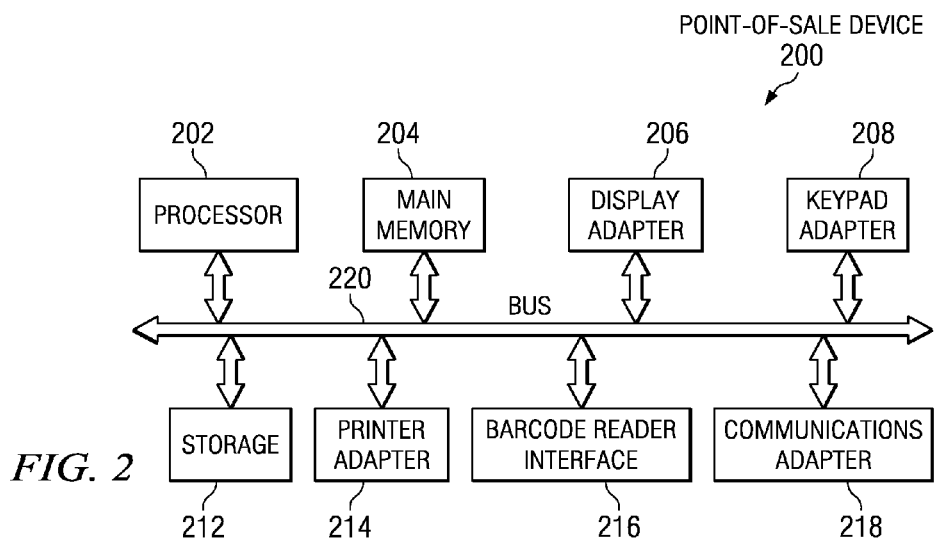
FIG. 2 is a block diagram illustrating an exemplary hardware configuration of a point-of-sale device in accordance with the illustrative embodiments.

FIG. 2 is a block diagram illustrating an exemplary hardware configuration of a point-of-sale device in accordance with the illustrative embodiments. Point-of-sale device 200 is an example of a point-of-sale device, such as point-of-sale terminal 102 in FIG. 1, from which transaction information is received at a fiscal printer, such as fiscal printer 104 in FIG. 1. Point-of-sale device 200 employs a bus architecture. Main memory 204, display adapter 206, keypad adapter 208, storage 212, printer adapter 214, barcode reader interface 216, and communications adapter 218 are connected to bus 220.

An operating system runs on processor 202 and is used to coordinate and provide control of various components within point-of-sale device 200 in FIG. 2. The operating system may be a commercially available operating system; however, point-of-sale device 200 may alternatively include specialized code for the point-of-sale device. Instructions for the operating system and applications or programs are located on storage devices, such as storage 212, and may be loaded into main memory 204 for execution by processor 202. Barcode reader interface 216 may receive information, such as product selection information, from a barcode reader.

Those of ordinary skill in the art will appreciate that the hardware in FIG. 2 may vary depending on the implementation. Other internal hardware or peripheral devices, such as flash read-only memory (ROM) (or equivalent non-volatile memory) or optical disk drives and the like, may be used in addition to or in place of the hardware depicted in FIG. 2. For example, point-of-sale device 200 may be a hand held computing device, which is configured with ROM and/or flash ROM to provide non-volatile memory for storing operating system files and/or user-generated data.

Figure 3:
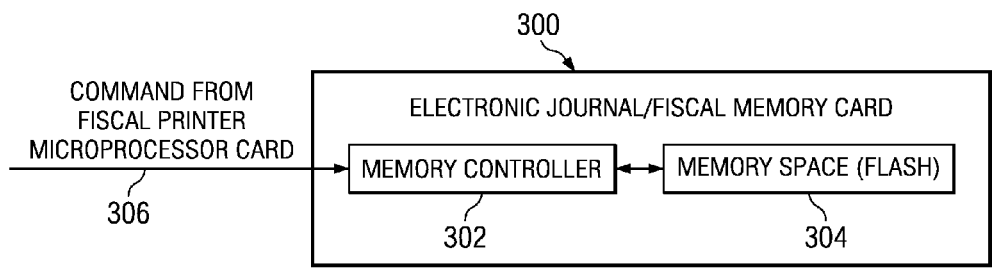
FIG. 3 is a block diagram illustrating the hardware configuration of an electronic journal card or fiscal memory card in a fiscal printer in accordance with the illustrative embodiments.

FIG. 3 is a block diagram illustrating the hardware configuration of an electronic journal card or fiscal memory card in a fiscal printer in accordance with the illustrative embodiments. Electronic journal/fiscal memory card 300 is an example of electronic journal card 106 or fiscal memory card 108 in FIG. 1. Electronic journal/fiscal memory card 300 is shown to comprise memory controller 302 and memory space 304.

Memory controller 302 receives memory addresses and transaction data from microprocessor card 112 in fiscal printer 104 in FIG. 1. The transaction data may comprise intermediate (i.e., individual) sales transaction information and/or aggregate sales information over a period of time. Microprocessor card 112 may initiate a write to memory space 304 in electronic journal/fiscal memory card 300 by providing memory addresses and transaction data to memory controller 302 when microprocessor card 112 receives transaction data from point-of-sale terminal 102 in FIG. 1, or at a predetermined time period (e.g., close of business hours).

Memory controller 302 controls writes to memory space 304. When microprocessor card 112 in fiscal printer 104 in FIG. 1 initiates a write of transaction data to memory space 304 in electronic journal/fiscal memory card 300, the microprocessor sends a write command 306 to memory controller 304. The microprocessor provides memory controller 302 with the address in memory space 304 in which the microprocessor desires to write the transaction data.

Memory space 304 is divided into sections of equal size. Each memory section, or memory location, corresponds to a single bit, called a "marker bit". The marker bit may be stored either in a special area of memory space 304 or in an external memory space (shown in FIG. 4). The marker bit for a memory location is used to indicate whether or not transaction data has been written to that location. A memory location has been written to if the content of the corresponding marker bit specifies a "written" state. Conversely, a memory location has not been written to if the content of the corresponding marker bit specifies an "unwritten" state. Examples of written/unwritten states include, but are not limited to, "True"/"False", "0"/"1", "Yes"/"No", and the like. The erase functionality for memory space 304 holding the transaction data and the marker bit information may be removed to prevent accidental overwriting of the data.

Before writing the transaction data to memory space 304, memory controller 302 monitors and checks the marker bit in memory space 304 that corresponds to the given address. If memory controller 302 determines that the particular memory location has already been written to (i.e., marker bit is in a "written" state), memory controller 302 informs the microprocessor card in the fiscal printer that the desired memory location cannot be used by sending a signal back to the microprocessor card to request another memory address. The microprocessor card then selects another memory location in memory space 304 in which to write the transaction data, and provides memory controller 302 with the new address in another write command. This process repeats until the check performed by memory controller 302 on the marker bit of the memory address selected by the microprocessor card indicates that the memory location has not been written to. In other words, the process cycles until a valid (i.e., unwritten) memory address is found.

If the memory location has not been written to (i.e., the marker bit is in an "unwritten" state), memory controller 302 sets the marker bit for that memory location to the "written" state. Memory controller 302 then writes the transaction data to the given memory address. The marker bit is set to a "written" state when writing transaction data to the memory space to prevent overwriting good transaction data. The marker bit is also set to a "written" state so that if the write operation fails in the middle of writing the transaction, that memory location cannot be rewritten. In this manner, memory controller 302 provides for a one-time write operation to each memory address in memory space 304 to prevent overwriting good transaction data and to prevent rewriting of transaction data to a memory location in which a failure previously occurred.

In another embodiment, the marker bit information may actually comprise two bits, wherein one of the bits comprises a marker bit indicating whether or not a corresponding memory location has been written to, and the other bit comprises a delimiter bit indicating whether the write to the memory location is valid (i.e., has completed). The marker bit is checked by memory controller 302 to determine if a write to the memory location has been initiated. While the marker bit specifies that a write to the memory location has been started, the delimiter bit is then checked by memory controller 302 to determine if the write has completed or finished. A write which was started in the memory location may not finish due to various causes, such as a bad area in the memory space or a power failure. Thus, even though a memory location has been written to, the data written to the memory location may not be valid. Consequently, if the marker bit indicates an "unwritten" state and the delimiter bit indicates an "unfinished" state, memory controller 302 may determine that no write has been attempted at that memory location, and thus the memory location is empty. If the marker bit indicates a "written" state and the delimiter bit indicates an "unfinished" state, memory controller 302 may determine that the data in the memory address is bad, and another write cannot be attempted to that memory location. If the marker bit indicates a "written" state and the delimiter bit indicates a "finished" state, memory controller 302 may determine that the data in the memory address is valid. Thus, the memory controller may employ only the marker bit embodiment if the memory controller only wants to know whether or not to perform a write to a memory location. However, the memory controller may employ the marker bit/delimiter bit embodiment in order to also know whether or not data written to the memory location is good/valid.

Figure 4:
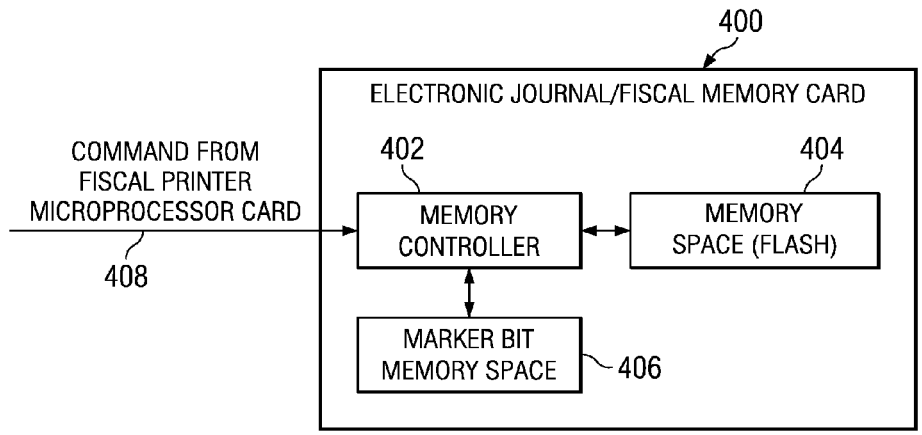
FIG. 4 is a block diagram illustrating an alternative hardware configuration of an electronic journal card or fiscal memory card in a fiscal printer in accordance with the illustrative embodiments.

FIG. 4 is a block diagram illustrating an alternative hardware configuration of an electronic journal card or fiscal memory card in a fiscal printer in accordance with the illustrative embodiments. Electronic journal/fiscal memory card 400 is an example of electronic journal card 106 or fiscal memory card 108 in FIG. 1. Electronic journal/fiscal memory card 400 is shown to comprise memory controller 402, memory space 404, and marker bit memory space 406.

As described above in FIG. 3, a marker bit is used to indicate whether or not transaction data has been written to a corresponding location in the memory space. However, in this illustrative example, the marker bits are stored in a memory space external to the memory space which holds the transaction data. This external memory space is marker bit memory space 406, and is used for storing the marker bits corresponding to the memory sections in memory space 404. A marker bit in marker bit memory space 406 indicates whether a corresponding memory location in memory space 404 has been written to. If the content of the marker bit specifies a "written" state, the corresponding memory location in memory space 404 has been written to. Conversely, if the content of a marker bit in marker bit memory space 406 specifies an "unwritten" state, the corresponding memory location in memory space 404 has not been written to.

When the microprocessor in the fiscal printer issues write command 408 to memory controller 404 in electronic journal/fiscal memory card 400 containing an address in memory space 404 in which the microprocessor card desires to write transaction data, memory controller 402 checks the marker bit in marker bit memory space 406 that corresponds to the given address. If memory controller 402 determines that the marker bit in marker bit memory space 406 which corresponds to the given memory location is in a "written" state, memory controller 402 instructs the microprocessor to request another memory address. The microprocessor then selects another memory location in memory space 404 in which to write the transaction data, and issues another write command to memory controller 402 containing the new address. This process repeats until the check performed by memory controller 402 on the marker bit in marker bit memory space 406 for the memory address selected by the microprocessor card indicates that a valid memory address is found.

If the marker bit is in an "unwritten" state, memory controller 402 sets the marker bit in marker bit memory space 406 for that memory location to the "written" state. Memory controller 402 then writes the transaction data to the given memory address in memory space 404.

Figure 5:
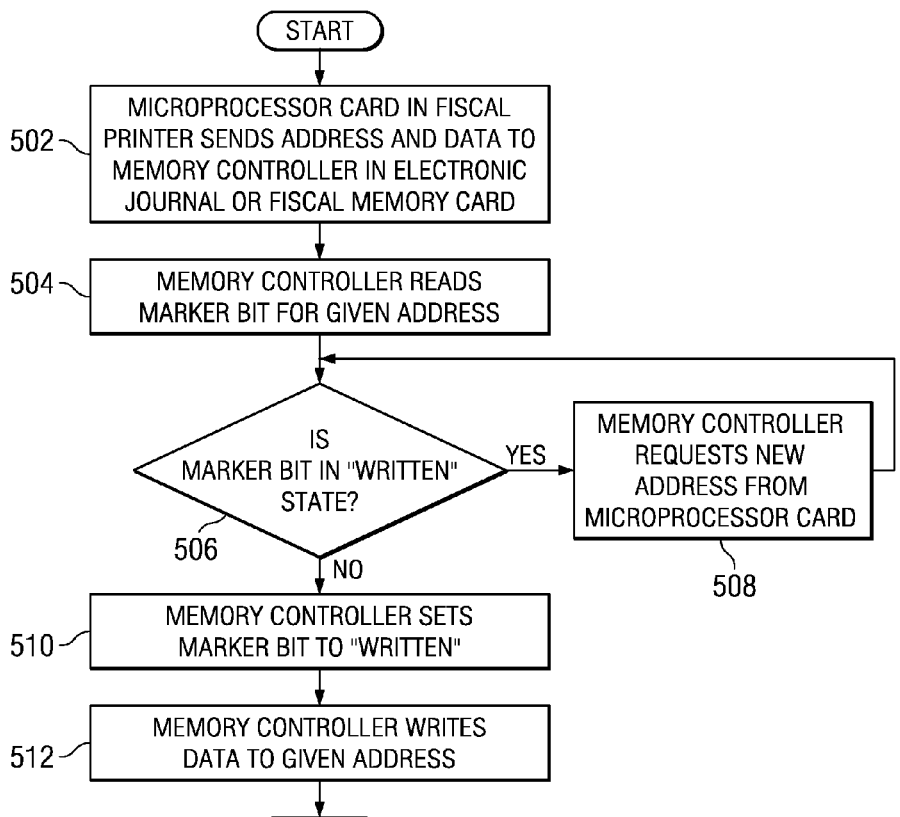
FIG. 5 is a flowchart of a process for monitoring writes to memory space in accordance with the illustrative embodiments.

FIG. 5 is a flowchart of a process for monitoring writes to memory space in accordance with the illustrative embodiments. The process depicted in FIG. 5 may be implemented using a fiscal printer and an electronic journal/fiscal memory card 300 in FIG. 3 or electronic journal/fiscal memory card 400 in FIG. 4.

The process begins when the microprocessor card in a fiscal printer sends a memory address and transaction data to the memory controller in the electronic journal or fiscal memory card (step 502). The microprocessor card may send the address and transaction data to the memory controller in response to the microprocessor card receiving transaction data from a point-of-sale device, or at a pre-determined time period (e.g., close of business hours). When the memory address is received by the memory controller, the memory controller reads the marker bit for the given address in the memory space (step 504). The memory controller then checks the marker bit to determine if the marker bit for the given address is in the "written" state (step 506). If the marker bit is in the "written" state, the memory controller requests a new memory address from the microprocessor (step 508), since the marker bit indicates that the given memory address has already been written to. The process returns to step 506, where the microprocessor sends a new memory address to the memory controller.

If the marker bit for the given memory address is in the "unwritten" state, the memory controller sets the marker bit for the given memory address to "written" (step 510). The memory controller then writes the transaction data to the given memory address (step 512).

Figure 6A:
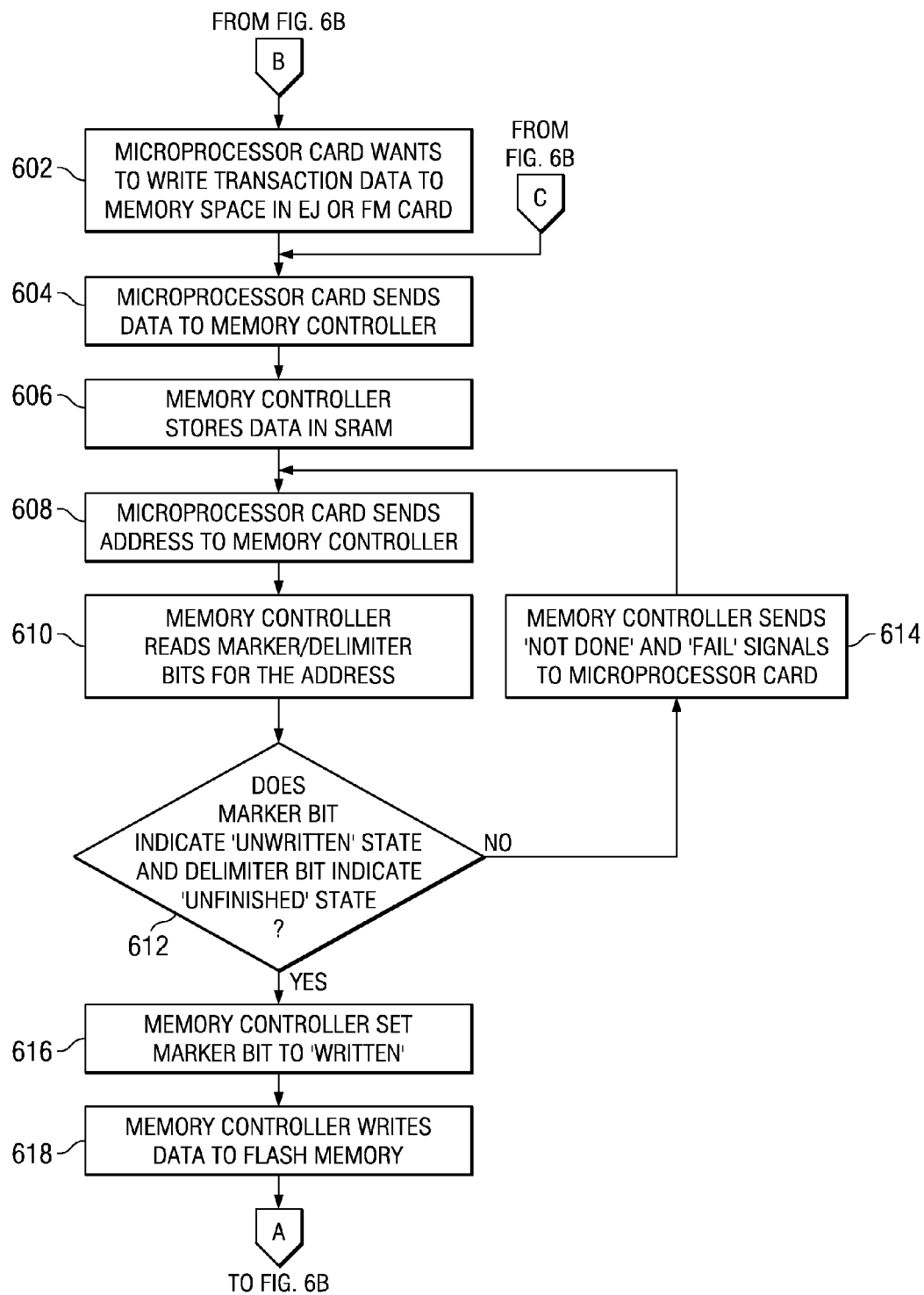
FIGS. 6A and 6B illustrate a flowchart of an alternative process for monitoring writes to memory space in accordance with the illustrative embodiments.
Figure 6B:
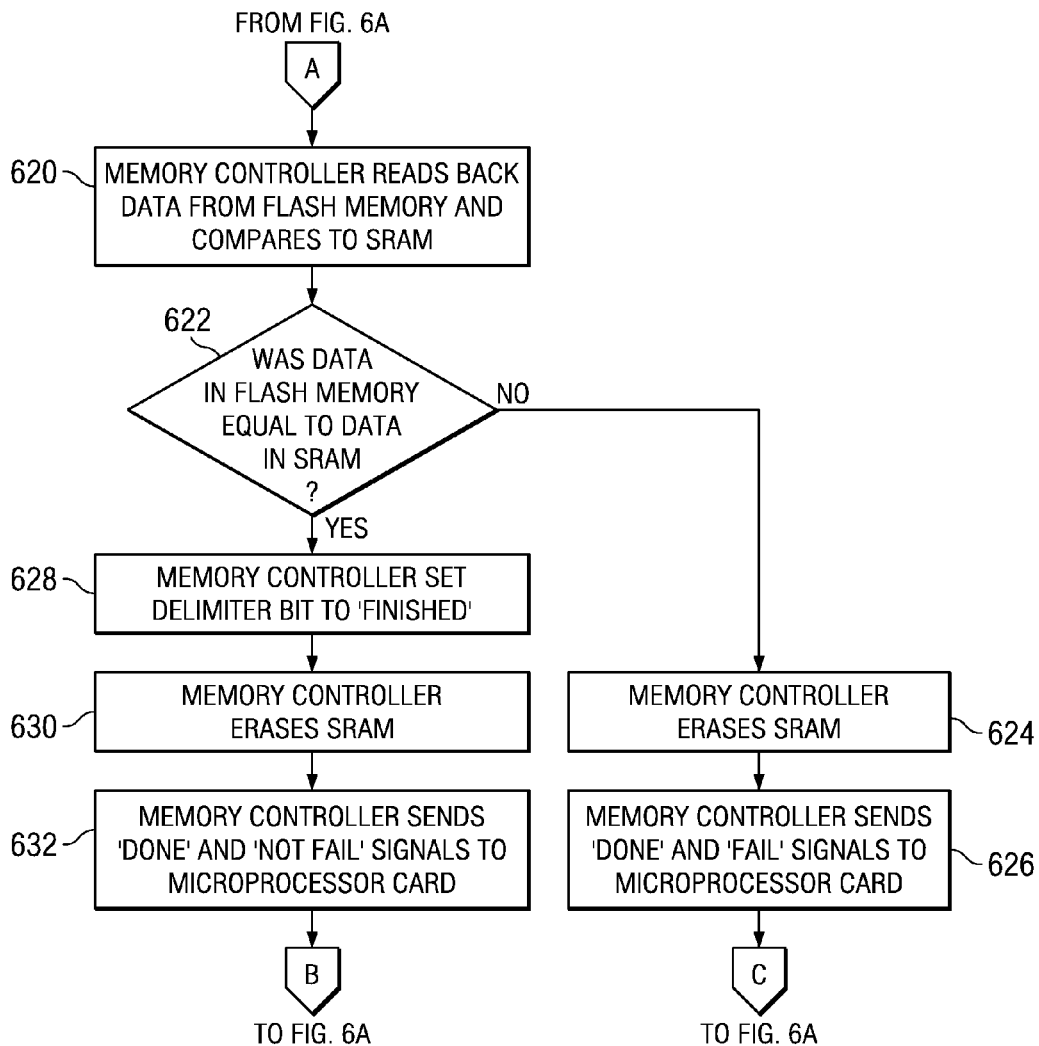

FIGS. 6A and 6B illustrate a flowchart of an alternative process for monitoring writes to memory space in accordance with the illustrative embodiments. The process depicted in FIGS. 6A and 6B may be implemented in a fiscal printer containing electronic journal/fiscal memory card 300 in FIG. 3 or electronic journal/fiscal memory card 400 in FIG. 4.

The process begins when the microprocessor card in a fiscal printer wants to write transaction data to memory space in the electronic journal or fiscal memory card (step 602). The microprocessor card sends the transaction data to the memory controller in the electronic journal or fiscal memory card (step 604). When the memory controller receives the transaction data, the memory controller stores the data in SRAM in the electronic journal or fiscal memory card (step 606). The microprocessor card then sends the memory space address in which the microprocessor card wants to write the transaction data to the memory controller (step 608).

The memory controller then reads the marker bit and the delimiter bit for the address (step 610). The memory controller makes a determination as to whether the marker bit indicates an 'unwritten' state and the delimiter bit indicates an 'unfinished' state (step 612). If the marker bit does not indicate an 'unwritten' state and the delimiter bit does not indicate an 'unfinished' state ('no' output of step 612), the memory controller sends a write 'not done' signal and a write completion 'fail' signal to the microprocessor card (step 614), and the process returns to step 610.

Turning back to step 612, if the marker bit indicates an 'unwritten' state and the delimiter bit indicates an 'unfinished' state ('yes' output of step 612), the memory controller sets the marker bit to the 'written' state (step 616). The memory controller then writes the transaction data to flash memory (step 618).

The memory controller then reads the transaction data from flash memory and compares the data to the transaction data temporarily stored in SRAM (step 620). The memory controller makes a determination as to whether the transaction data stored in flash memory is equal to the transaction data temporarily stored in SRAM (step 622). If the data is not equal ('no' output of step 622), the memory controller erases the transaction data stored in SRAM (step 624), and sends a write 'done' signal and a write completion 'fail' signal to the microprocessor card (step 626). The process then returns to step 604.

Turning back to step 622, if the data is equal ('yes' output of step 622), the memory controller sets the marker bit to the 'finished' state (step 628). The memory controller then erases the transaction data stored in SRAM (step 630), and sends a write 'done' signal and a write completion 'not fail' signal to the microprocessor card (step 632). The process then returns to step 602.

The invention can take the form of an entirely hardware embodiment or an embodiment containing both hardware and firmware elements. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing a hardware controlled one-time write for a fiscal printer, the computer implemented method comprising:
   receiving a signal at a memory controller in an electronic journal or fiscal memory card connected to a fiscal printer, wherein the signal comprises transaction data and an address in a memory space in the electronic journal or fiscal memory card;
   responsive to receiving the signal comprising the transaction data and the address at the memory controller, storing the transaction data in a memory storage area in the electronic journal or fiscal memory card;
   checking a marker bit corresponding to the address to determine if the marker bit is in a written state, wherein the marker bit is in a separate memory location than the address;
   responsive to a determination that the marker bit is not in a written state, setting the marker bit to the written state;
   further responsive to the determination that the marker bit is not in the written state, writing the transaction data to the address in the memory space;
   responsive to writing the transaction data to the address in the memory space, comparing the transaction data in the memory storage area against the transaction data stored in the memory space;
   if the transaction data in the memory storage area equals the transaction data stored in the memory space, setting a delimiter bit corresponding to the address in the memory space to a finished state and erasing the transaction data stored in the memory storage area, wherein the delimiter bit indicates whether writing the transaction data is completed; and
   if the transaction data in the memory storage area does not equal the transaction data stored in the memory space, erasing the transaction data stored in the memory storage area and obtaining a second signal comprising the transaction data and a second address in the memory space.

2. The computer implemented method of claim 1, further comprising:
   responsive to a determination that the marker bit is in a written state, receiving a second signal comprising a second address in the memory space;
   checking a marker bit corresponding to the second address to determine if the marker bit corresponding to the second address is in a written state;
   responsive to a determination that the marker bit corresponding to the second address is not in a written state, setting the marker bit corresponding to the second address to the written state; and
   writing the transaction data to the second address in the memory space.

3. The computer implemented method of claim 1, wherein the marker bit indicates whether a write to the memory space has occurred.

4. The computer implemented method of claim 1, wherein the delimiter bit indicates whether a write to the memory space contains valid transaction data.

5. The computer implemented method of claim 1, wherein the transaction data and the address is received from a microprocessor card in the fiscal printer.

6. The computer implemented method of claim 1, wherein the transaction data is generated from a point-of-sale device connected to the fiscal printer.

7. The computer implemented method of claim 1, wherein the transaction data comprises at least one of individual sales transaction information or total sales transaction information.

8. The computer implemented method of claim 2, wherein the second address is obtained from the microprocessor in the fiscal printer.

9. The computer implemented method of claim 2, wherein the receiving, checking, setting, obtaining, and writing steps are performed by the memory controller in the electronic journal or fiscal memory card.

10. The computer implemented method of claim 1, wherein at least one of the marker bit and delimiter bit is stored in the memory space.

11. The computer implemented method of claim 1, wherein at least one of the marker bit and delimiter bit is stored in a second memory space external to the memory space.

12. A data processing system for providing a hardware controlled one-time write for a fiscal printer, the data processing system comprising:

a fiscal printer comprising a microprocessor card; and at least one of an electronic journal card or a fiscal memory card comprising a memory controller and a memory space, wherein the memory controller is connected to the microprocessor card in the fiscal printer;

wherein the memory controller in the electronic journal or fiscal memory card receives a signal from the microprocessor card comprising transaction data and an address in the memory space in the electronic journal or fiscal memory card, wherein the memory controller stores the transaction data in a memory storage area in the electronic journal or fiscal memory card in response to receiving the signal comprising the transaction data and the address at the memory controller, wherein the memory controller checks a marker bit corresponding to the address to determine if the marker bit is in a written state, wherein the marker bit is in a separate memory location than the address, wherein the memory controller sets the marker bit to the written state in response to a determination that the marker bit is not in a written state, wherein the memory controller writes the transaction data to the address in the memory space, wherein the memory controller compares the transaction data in the memory storage area against the transaction data stored in the memory space in response to writing the transaction data to the address in the memory space, wherein the memory controller sets a delimiter bit corresponding to the address in the memory space to a finished state and erases the transaction data stored in the memory storage area if the transaction data in the memory storage area equals the transaction data stored in the memory space, and wherein the memory controller erases the transaction data stored in the memory storage area and obtains a second signal comprising the transaction data and a second address in the memory space if the transaction data in the memory storage area does not equal the transaction data stored in the memory space, wherein the delimiter bit indicates whether writing the transaction data is completed.

13. The data processing system of claim 12, wherein the memory controller receives a second signal comprising a second address in the memory space in response to a determination that the marker bit is in a written state, wherein the memory controller checks a marker bit corresponding to the second address to determine if the marker bit corresponding to the second address is in a written state, wherein the memory controller sets the marker bit corresponding to the second address to the written state in response to a determination that the marker bit corresponding to the second address is not in a written state, and wherein the memory controller writes the transaction data to the second address in the memory space.

14. The data processing system of claim 12, wherein the marker bit indicates whether a write to the memory space has occurred.

15. The data processing system of claim 12, wherein the delimiter bit indicates whether a write to the memory space contains valid transaction data.

16. The data processing system of claim 12, wherein the transaction data comprises at least one of individual sales transaction information and total sales transaction information.

17. The data processing system of claim 12, wherein at least one of the marker bit and delimiter bit is stored in the memory space.

18. The data processing system of claim 12, wherein at least one of the marker bit and delimiter bit is stored in a second memory space external to the memory space.

* * * * *